United States Patent [19]

Abrahamson et al.

[11] 4,338,056
[45] Jul. 6, 1982

[54] SYSTEM FOR LOADING AND UNLOADING A KILN

[75] Inventors: Daniel P. Abrahamson, Phoenix; Paul M. Thomas, Paradise Valley, both of Ariz.

[73] Assignee: Builders Equipment Company, Phoenix, Ariz.

[21] Appl. No.: 145,701

[22] Filed: May 1, 1980

[51] Int. Cl.³ .............................................. F26B 3/18
[52] U.S. Cl. .................................... 414/152; 414/156; 414/280; 414/281; 414/285; 414/286
[58] Field of Search ............... 414/150, 152, 156, 157, 414/277, 278, 280, 281, 285, 286

[56] References Cited

U.S. PATENT DOCUMENTS

| | | | |
|---|---|---|---|
| 2,502,940 | 4/1950 | Gelbman | 414/286 X |
| 2,668,614 | 2/1954 | Lawson | 198/746 |
| 3,528,566 | 9/1970 | Weir | 414/285 |
| 3,719,288 | 3/1973 | Schmitt et al. | 414/280 |
| 3,850,316 | 11/1974 | Schmitt | 414/278 |
| 4,016,986 | 4/1977 | Thomas | 414/280 X |

Primary Examiner—Robert G. Sheridan
Attorney, Agent, or Firm—Luedeka & Fitch

[57] ABSTRACT

A system is provided for loading concrete blocks, carried on pallets, into a kiln. The kiln includes a front end wall and a rear end wall and a plurality of guideways extending from the front end wall to the rear end wall. The guideways are arranged in a grid pattern of horizontally aligned layers and vertically aligned tiers. The pallets are inserted into a selected guideway. A laterally movable main frame carries a vertically movable subframe which includes an arcuate conveyor. An elevator delivers pallets to the subframe which inserts the pallets into the selected guideway. The main frame and subframe are indexed for exact alignment with the selected guideway.

9 Claims, 13 Drawing Figures

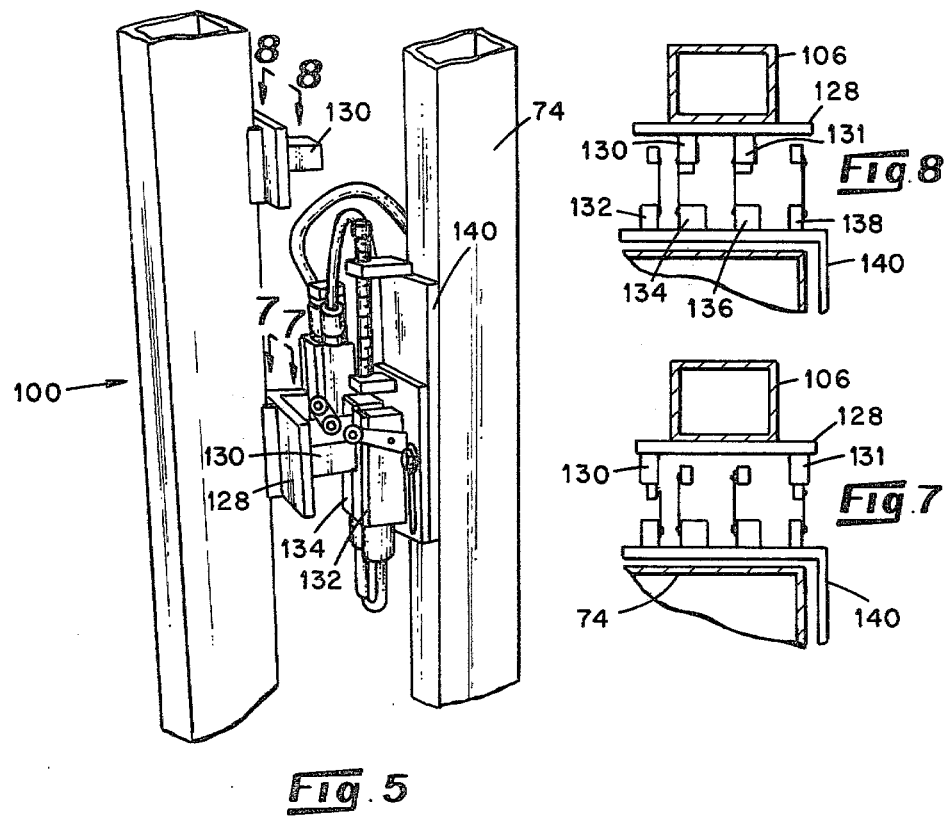
Fig. 5
Fig. 8
Fig. 7
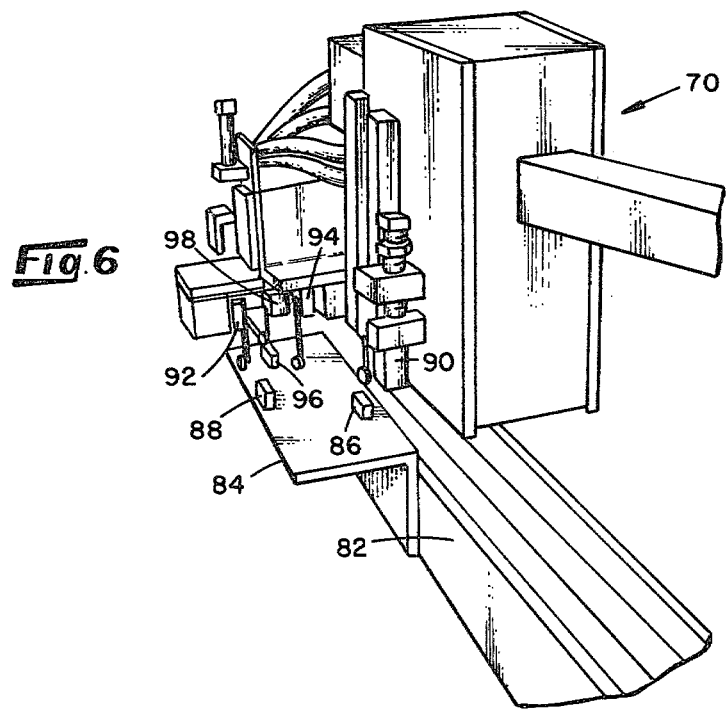
Fig. 6

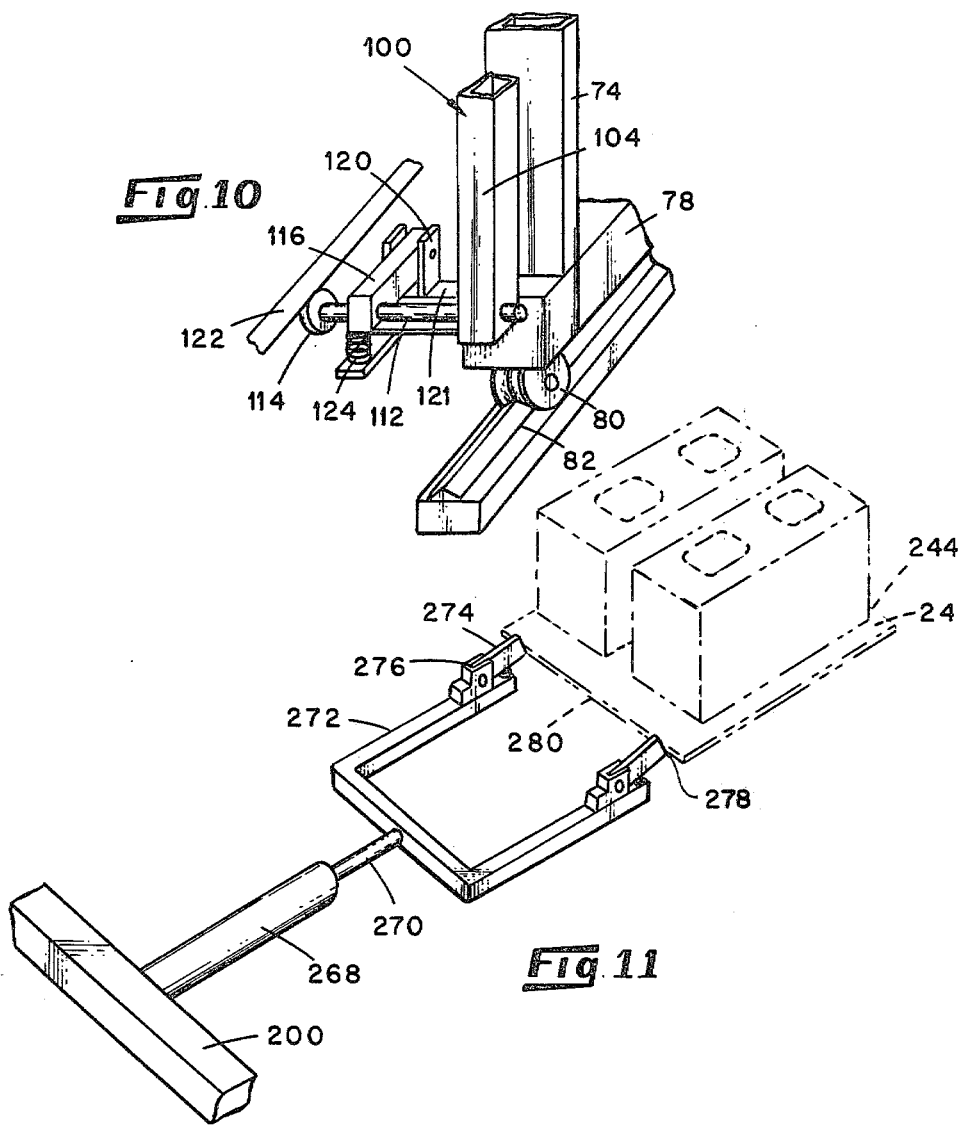

SYSTEM FOR LOADING AND UNLOADING A KILN

This invention relates generally to treatment chambers such as kilns which are used in the curing of concrete blocks and more particularly to an apparatus for the loading and unloading of such chambers.

Certain kilns for curing concrete blocks generally include a pair of vertical side walls and a roof structure which are adapted to enclose the blocks being cured. A plurality of elongated guideways, parallel to the side walls, are provided for supporting pallets carrying green blocks during curing. The guideways are arranged in a grid pattern in horizontally aligned layers and vertically aligned tiers. Pallets carrying green blocks are fed onto one end of the guideways and are discharged at the other end after curing. In order to maintain the atmosphere in the kiln, the infeed and discharge ends of the kiln are provided with closure means to prevent heat and/or moisture from escaping during curing. U.S. Pat. No. 4,016,986 discloses such a kiln in which the closure means comprises a plurality of vertically aligned panels for each tier. The panels are vertically slidable to permit access to a single guideway of a tier for loading while the other guideways of the tier remain enclosed.

Various types of apparatus have been used for loading and unloading kilns. In general, pallets carrying green blocks are successively carried by conveyors from a block making machine to a location adjacent to a selected tier of guideways. Elevating means are provided for raising the pallets carrying green blocks to the level of the selected guideway to be loaded and also for lowering pallets carrying cured blocks from the selected guideway to ground level for removal by conveyor means. The elevator means are often movable along the faces of the kiln so that they are movable to another tier of guideways after a first tier is completed.

After a guideway is selected for loading, the closure means for the selected guideway, and in some cases adjacent guideways, is opened and pallets are sequentially pushed laterally from the elevator means onto the selected guideway, displacing pallets previously located on the selected guideway and simultaneously discharging a pallet from the selected guideway at the discharge end. The discharged pallets, carrying cured blocks, are accepted by an unloading apparatus, including elevator means, and carried to a stacking or storage location by conveyor means.

Because of the economics involved in the manufacture of concrete blocks, it is essential that kilns be operated on a large volume basis. Accordingly, it is important that the loading and simultaneous unloading be accomplished as rapidly as possible in order to maximize use of the kiln. Heretofore, several factors have severely limited the rate at which blocks have been loaded into, and unloaded from, kilns.

Green blocks are susceptible to deformation, so that they are handled relatively carefully. For example, the pallets have been moved slowly in order to avoid rapid acceleration and deceleration, which can deform green blocks. However, the green blocks are more stable in the length direction than in the width direction. That is to say, the blocks, which have the general shape of a figure-eight, are more resistant to turning over or deformation from shocks which occur along their length. Because the green blocks can absorb greater shocks when they travel in a path parallel to their longitudinal dimension, they can be moved faster in this direction. Thus, it is desirable for them to travel in the longitudinal direction at all times. Some prior loading apparatus have required the green blocks to travel longitudinally for part of the path and laterally over the remainder of the path. Thus, the overall speed of loading has been limited by the block stability in the width direction. However, if the blocks travel only in their longitudinal, or more stable, direction, the overall speed can be increased subject to this higher limit.

Another aspect of prior loading apparatus which has greatly reduced the rate of loading and unloading kilns lies in the means used for pushing pallets from the conveyors to the guideways. Prior loading apparatus have employed a hydraulic cylinder and extendable piston rod. The piston rod has acted directly upon the pallets, extending and retracting within the plane defined by the pushed pallet, pushing the pallets from a conveyor or elevator onto a guideway. Thus, after a first pallet has been pushed onto a guideway, the piston rod must retract out of the path of the pushed pallet before a second pallet can be placed in position for pushing. In the meantime, the succeeding pallets on the conveyor must wait until the piston rod retracts; i.e., the conveyor must start and stop repetitively. As noted above, this type of accelerative action can deform green blocks unless the conveyor speed is maintained quite low. Alternatively, the pallets may be widely spaced apart, but this is unsatisfactory also.

The movement of the loading and unloading apparatus from one guideway to another frequently leads to difficulties because the pallets must be exactly aligned with the guideways into which they are pushed. Exact alignment is important because the guideways frequently comprise a pair of opposing U-shaped channels which are just wide enough to accommodate the thickness of a pallet as it slides along the length of the channel. The close tolerances between the channels and the pallet are intended to maintain strictly linear travel by the pallet and to prevent pallets from becoming jammed in the guideway. The pallets are also prevented from being pushed onto an adjacent pallet if a forward pallet gets stuck.

If the loading apparatus is shifted out of alignment in any of the three dimensions relative to the selected guideway, i.e., in height or in the planes parallel to, and normal to the face of the kiln, the pallets cannot be pushed onto the guideways. They strike the face of the kiln or jam in the channels. Such shifting of the loading apparatus relative to the kiln is a common occurrence because the loading apparatus and kiln are heavy and it is a common occurrence for the supports to settle unevenly. The settling problem is magnified by the fact that the loading apparatus and unloading apparatus are often mounted upon rails for movement along the face of the kiln. The movement of the heavy loading and unloading apparatus back and forth along the faces of the kiln can cause gradual shifting of the rails relative to the kiln. Usually the rails do not shift as a unit, but rather one will settle or shift faster than the other at one location whereas the rate may be reversed in another location. In either case, the apparatus is tilted toward or away from the kiln. In some cases the rails have been mounted upon a concrete pad adjacent to the kiln. While such an arrangement fixes the rails relative to each other, it does not prevent the pad from shifting relative to the kiln and thus tilting the apparatus. As noted above, even a very slight variation can halt the transfer of pallets from the loading apparatus to the kiln. Each time the apparatus shifts out of alignment with a guideway, the entire loading and unloading apparatus must be shut down until adjustments are made to realign the apparatus with the kiln. Obviously, such a system is quite time-consuming and thus expensive in a large-volume system. A massive foundation system is also an unsatisfactory solution, partly due to economic consideration, but also because it does not completely stop shifting.

It is therefore an object of the present invention to provide loading and unloading apparatus for a concrete block kiln which minimizes the time required to load and unload the kiln. It is also an object to provide a loading and unloading apparatus which are accurately aligned with each kiln guideway to be loaded and unloaded. It is a further object to provide kiln loading and unloading apparatus which transports the blocks only in their stable direction. Further objects and advantages will be apparent when the following description is read in connection with the drawings in which:

FIG. 7 is a fragmentary front elevational view of the left side (looking at the inlet side of the kiln) of the loading apparatus shown in FIG. 2.

FIG. 5 is a perspective view of a fragmentary portion of the vertical orienting means of the loading apparatus shown in FIG. 2.

FIG. 6 is a perspective view of a fragmentary portion of the horizontal orienting means of the loading apparatus shown in FIG. 2.

FIG. 7 is a plan view taken along line 7—7 in FIG. 5.

FIG. 8 is a plan view taken along line 8—8 in FIG. 5 showing the vertical orienting means when it has moved upwardly by one tier from the position shown in FIG. 5.

FIG. 10 is a perspective view of a lower end of the story pole which constitutes a part of the vertical orienting means.

FIG. 11 is a perspective view of the pusher system for the subframe shown in FIG. 9.

SUMMARY

Figure 1:
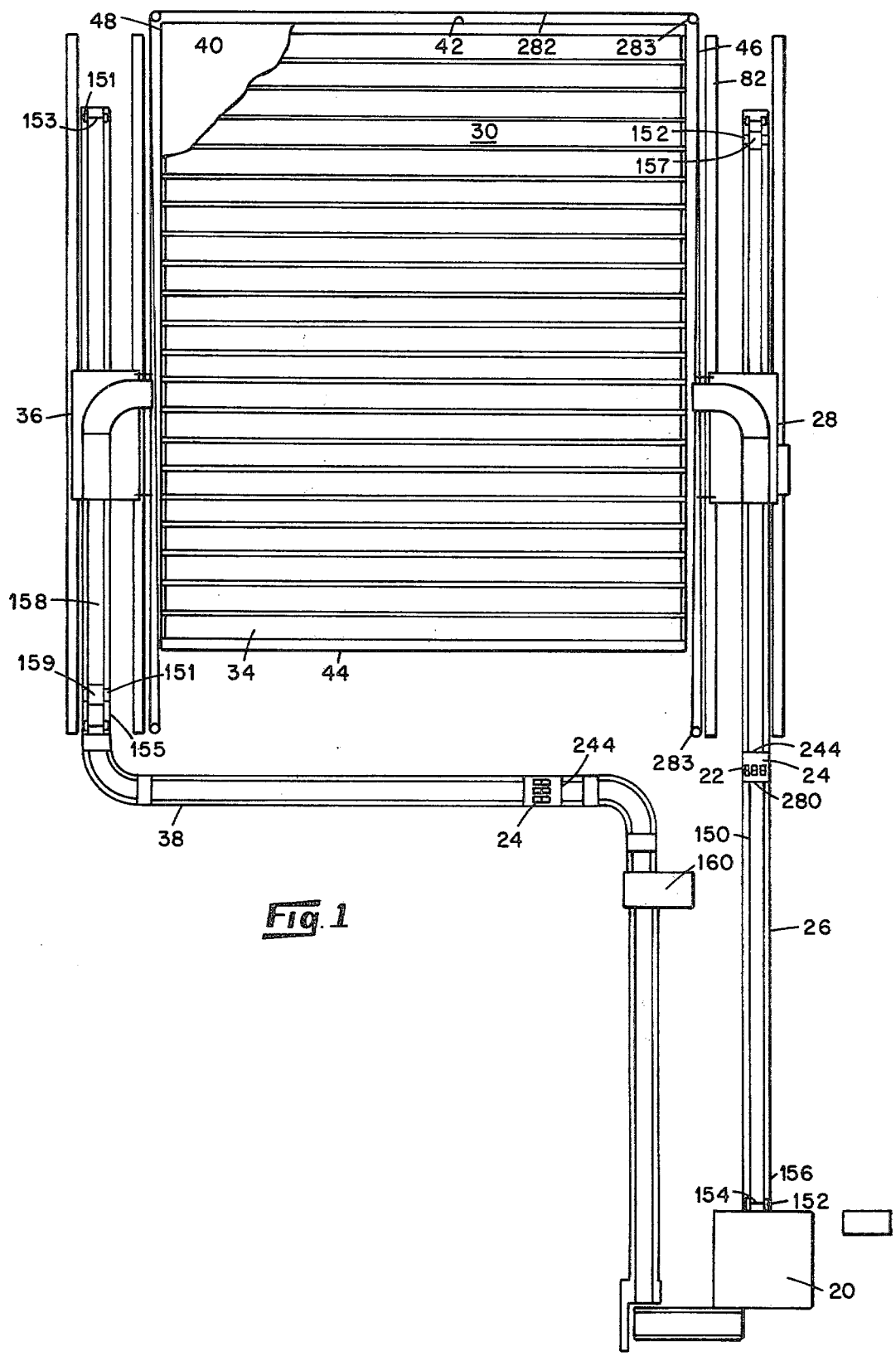
FIG. 1 is a diagrammatic view, partially in section of a system embodying various of the features of the present invention.

As will hereinafter become apparent, the apparatus shown in the drawings includes a conventional block-making machine 20 which forms green, i.e., uncured, cement blocks 22 and loads them onto pallets 24. The machine 20 is arranged to feed loaded pallets 24 onto the infeed conveyor means 26. The pallets 24 are carried by the conveyor means 26 to a loading apparatus 28 which includes means for orienting the loading apparatus 28 relative to the kiln 30. Elevator means included in the loading apparatus 28 carry the pallets 24 from the infeed conveyor means 26 to a vertically adjustable sub-frame 32 of the apparatus 28. Means are provided in the sub-frame 32 for opening access to a guideway 34, removing pallets 24 from the elevator means and pushing the pallets 24 into a guideway of the kiln 30.

As a pallet 24 is pushed into the kiln 30, another pallet 24 carrying cured blocks 22 is simultaneously discharged from the opposing end of the guideway 34 and onto a vertically adjustable sub-frame of the unloading apparatus 36. Means are provided for orienting the unloading apparatus 36 relative to the kiln 30. The pallets 24 are carried from the sub-frame of the unloading apparatus 36 to discharge conveyor means 38 by elevator means included in the unloading apparatus 36. The discharge conveyor means 38 carries the pallets 24 to a remote location for stacking and storage.

KILN

While the features of the present invention have application to various types of block kilns, it is illustrated in the drawings in connection with a kiln of the general type disclosed in Thomas U.S. Pat. No. 4,016,986. In order that the description is clear, the general structure of the Thomas kiln will be described in the following paragraphs and, in the event that a more complete description is required, reference may be had to that patent which is incorporated herein by reference.

The kiln 30 comprises a top wall 40, opposed side walls 42 and 44, a front end wall 46 and a rear end wall 48. The kiln is supported upon a suitable foundation. In the illustrated embodiment, spaced apart guideways 34, each having an infeed end and a discharge end, are arranged in a grid of horizontally aligned layers and vertically aligned tiers to slidingly receive and support pallets 24 carrying concrete blocks 22 or the like. Each of the guideways 34 includes a pair of U-shaped guideway rails 50 which are supported on a pair of front guideway posts 52 at the front end wall 46 of the kiln 30 and a pair of rear guideway posts 54 at the rear end wall 48 of the kiln 30. Each of the guideway rails 50 is parallel to the other of the pair and the pair of rails 50 are spaced apart to receive the pallets 24 or the like. The guideways 34 are spaced apart from one another to permit heated, moisturized air to flow therebetween and intimately contact the blocks 22.

An end closure system is provided at the front end wall 46 and the rear end wall 48 of the kiln 30. The illustrated end closure system includes a plurality of vertically aligned panels 56 which in the aggregate are proportioned to cover the front end wall 46 and rear end wall 48 of the kiln 30. The panels 56 are slidably mounted in spaced apart vertical guide means 58 positioned adjacent the guideway posts 52 and 54. The illustrated panels 56 are generally rectangular and are positioned so that each panel 56 covers one end of one of the guideways 34. The opposite side margins 60 of each panel 56 are slidably mounted for vertical movement in the vertical guide means 58. In order to provide a seal between vertically adjacent panels 56, their mating upper and lower edges 62 and 64, respectively, are nested. As shown, the upper edge 62 of each panel 56, is V-shaped and nests in the V-shaped groove on the lower edge 64 of the adjacent panel 56. The described construction provides a seal which minimizes the escape of gases or moisture between adjacent panels 56.

In order that a panel 56 may be raised to open a selected guideway 34, each of the panels 56 is provided on its outer face 66 with a connecting means which may be employed to raise a panel either manually or mechanically. The connecting means illustrated includes a pair of knobs 68 which are rigidly mounted on the outer face 66 of each panel 56 by bolts or the like in a horizontally aligned spaced-apart arrangement.

When any preselected panel 56 is raised from its closed position, it provides coverage for the end of the guideway 34 immediately above the guideway originally covered by the preselected panel. In order to prevent disengagement of the uppermost panel 56 from the guide means 58 when one of the guideways 34 is opened, the guide means 58 extend above the top wall 40 of the kiln 30 to receive the uppermost panel 56. In operation, after the material to be treated is inserted into a guideway 34, the preselected panel 56 is released and the preselected panel, and any panels above the preselected panel, return to the closed position under the force of gravity. This process is repeated for each guideway 34 until the kiln 30 is filled.

LOADING APPARATUS

Figure 2:
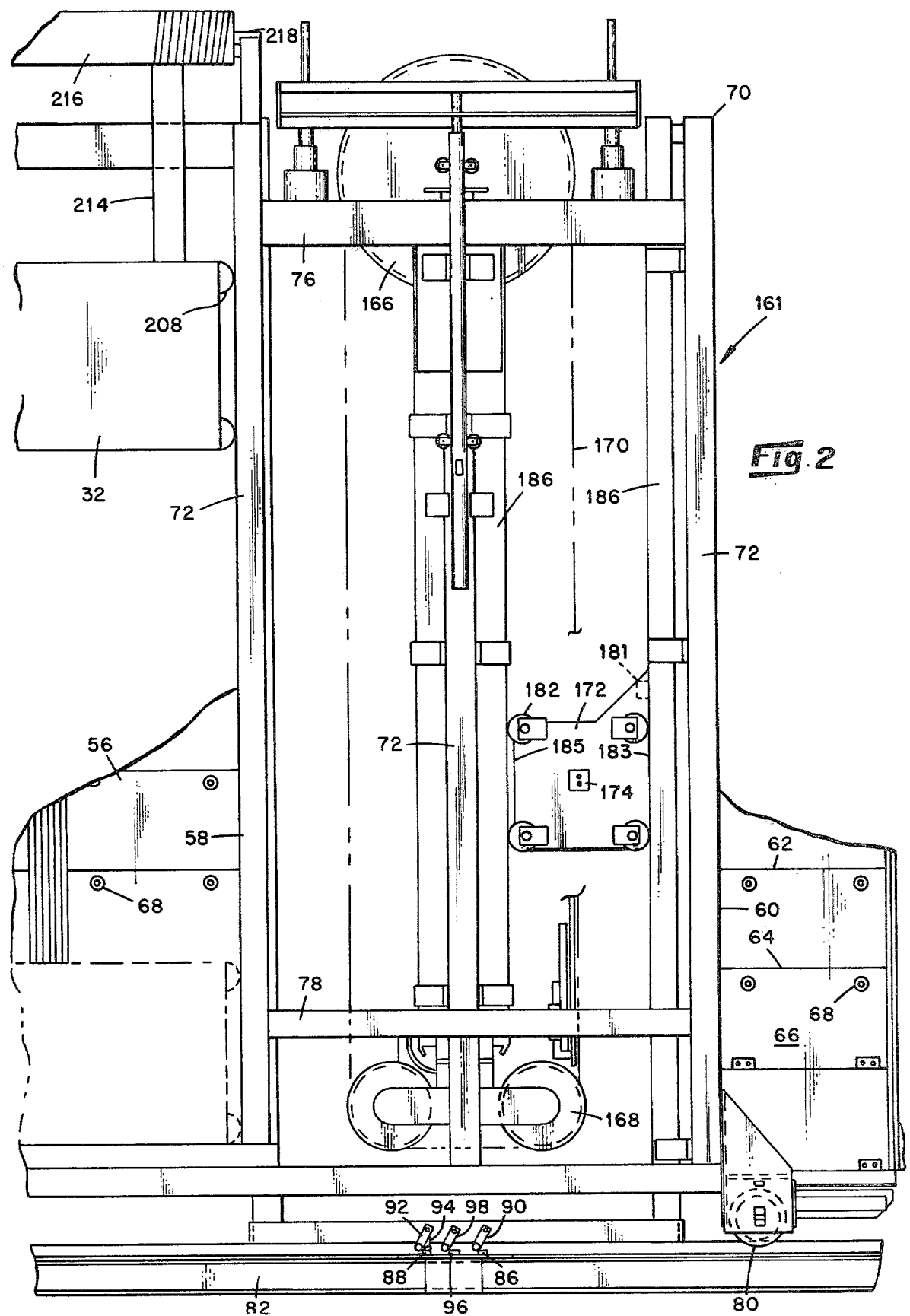
FIG. 2 is a fragmentary front elevational view of the right hand side (looking at the inlet side of the kiln) of a loading apparatus embodying various of the features of the present invention.
Figure 3:
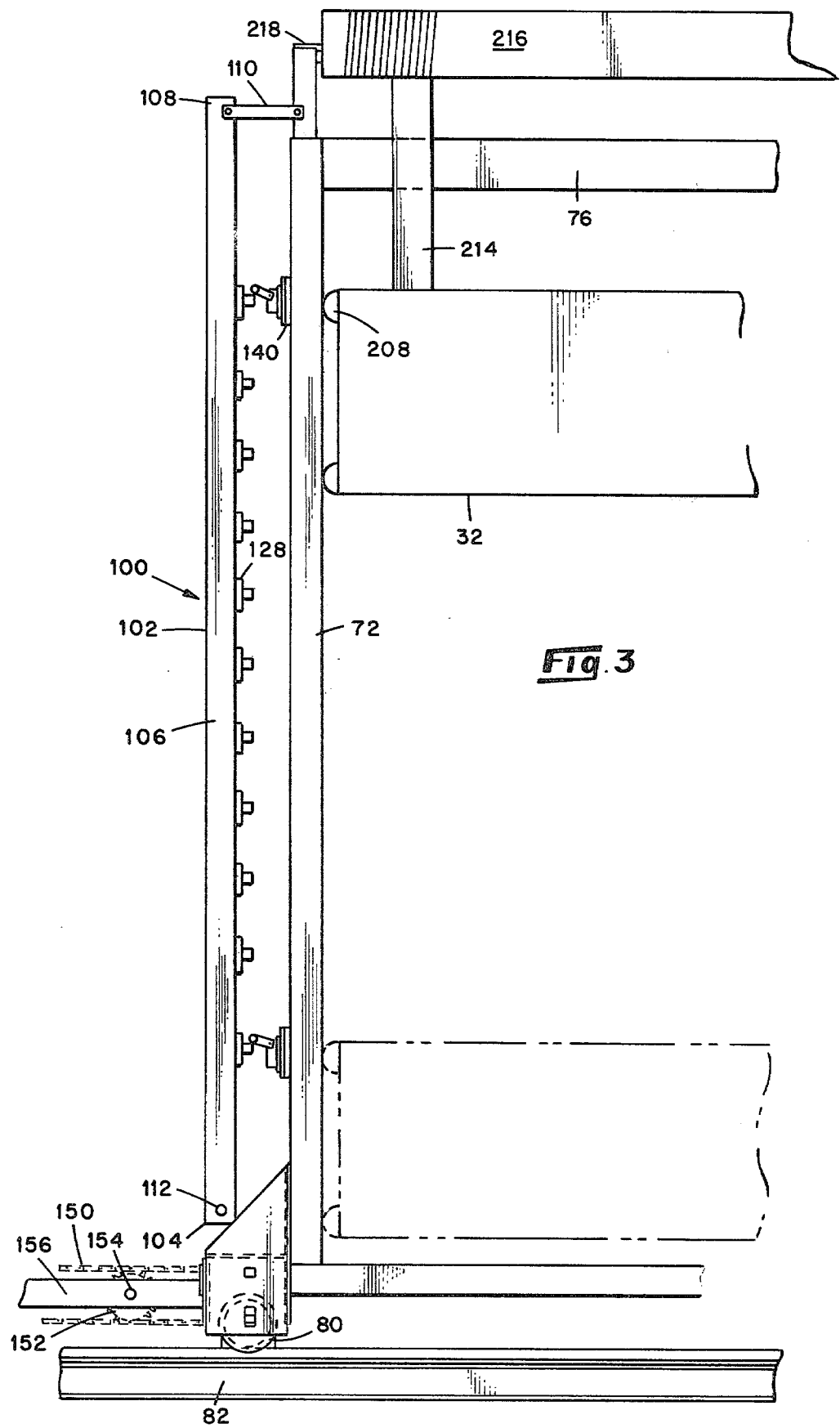
Figure 4:
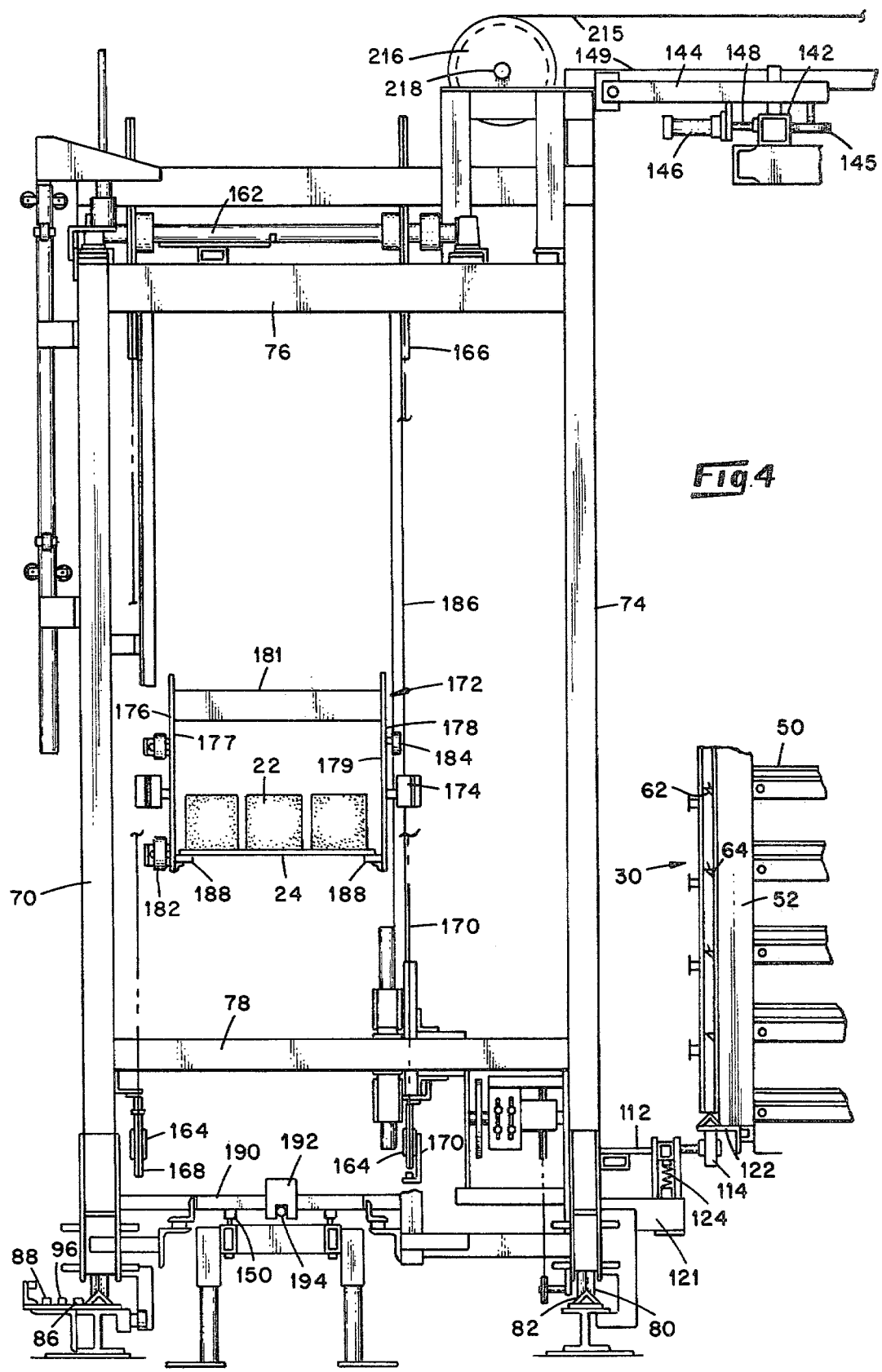
FIG. 4 is a side elevational view of the loading apparatus shown in FIG. 2.

The loading apparatus 28 is provided for successively inserting pallets 34 into the guideways of the kiln 30. The loading apparatus 28 includes a main frame 70 having three front vertical members 72 and three rear vertical members 74 (FIGS. 2, 3, and 4). A top rectangular frame 76 interconnects the upper ends of the vertical members 72 and 74 and a bottom rectangular frame 78 interconnects the lower ends of the vertical members 72 and 74. Suitable strut members (not shown) reinforce the frame 70 to ensure a rigid structure. The lower end of the frame 70 is mounted upon four rotatable wheels 80, one at each corner, the wheels 80 being supported on a pair of spaced apart parallel, horizontally disposed rails 82. The rails 82 are located in positions parallel to the face of the kiln 30 to permit the loading apparatus 28 to roll back and forth along the face of the kiln 30.

Means are provided in the loading apparatus 28 for locating a selected tier of guideways 34 and precisely aligning the loading apparatus relative to the selected tier (a vertically aligned series of guideways). As noted above, the loading apparatus 28 is laterally movable on the rails 82 along the front end wall 46 of the kiln 30. A plurality of indexing plates 84 are mounted along the side of the rail 82 each in a predetermined position relative to the lower end of each tier of guideways 34, i.e. each tier of guideways 34 has an individual indexing plate 84 associated therewith. Each indexing plate 84 carries a stop lug 86 and a directional lug 88. The stop lug 86 and directional lug 88 extend vertically upwardly from each indexing plate 84 a sufficient distance to actuate a limit switch, e.g. approximately one inch. A plurality of limit switches, including a stop switch 90, and a pair of directional switches 92 and 94 are mounted in predetermined positions on the main frame 70. The stop switch 90 is positioned so that as the loading apparatus 28 rolls along the rails 82, the switch 90 will engage a stop lug 86, indicating that the frame 70 is properly aligned with the lower end of the associated tier of guideways 34. The directional switches 92 and 94 are positioned so that as the stop switch 90 engages the stop lug 86, one of the directional switches 92 or 94 simultaneously engages a directional lug 88. The directional lugs 88 on the indexing plates 84 are alternatingly located on successive plates so that either the switch 92 or the switch 94 is engaged at each plate 84. When the switch 92 engages a directional lug 88, it conditions the apparatus to direct the sub-frame 32 to travel upwardly along the associated tier of guideways 34 as each guideway is filled. When the switch 94 engages a directional lug 88 it conditions the apparatus to direct the sub-frame 32 to travel downwardly along the associated tier as each guideway 34 is filled. The sub-frame 32 thus follows a generally serpentine path along the front end wall 46 of the kiln 30, i.e., upwardly along one tier of guideways 34, laterally with the frame 70 to the adjacent tier and downwardly along the adjacent tier of guideways 34 upwardly along the next, etc., along the entire front end wall 46 of the kiln 30.

In order to prevent sudden stops of the apparatus 28, a third lug, a deceleration lug 96, is provided upon each of the indexing plates 84 and a deceleration switch 98 is mounted upon the frame 70 for successive engagement with the lugs 96. The lugs 96 and switch 98 are positioned so that on each plate 84 the deceleration switch 98 engages the lug 96 before the stop switch 90 engages the lug 86. In this manner, the apparatus 28 is movable between tiers at a rapid speed, until the deceleration switch is engaged which signals to decrease the speed before the stop lug 86 is engaged.

SUB-FRAME VERTICAL ALIGNMENT

As has been pointed out above, one of the problems that may occur is that portions of the kiln 30 or rails 82 may settle relative to one another making a match between a given guideway and the sub-frame 32 imperfect. Means are provided to index the sub-frame 32 vertically to a fixed position relative to the lowermost guideway in each tier. This vertical indexing means includes a so-called story pole 100, for determining the vertical location of the sub-frame 32 relative to the lowermost guideway. The story pole 100 is mounted for vertical movement on the frame 70 adjacent to the front end wall 46 of the kiln 30. As shown in FIG. 3, the story pole 100 includes an elongated support member 102 having a lower end 104, a central portion 106 and an upper end 108. The upper end 108 is attached to the frame 70 by means of a link member 110, one end of which is pivotally attached to the story pole 100 and the other end of which is pivotally attached to the frame member 74. The lower end 104 of the story pole 100 includes a horizontally disposed arm member 112 which extends from the end 104 and toward the face of the kiln 30 (FIGS. 4 and 10). The arm 112 carries a rotatable guide wheel 114 whose periphery is oriented parallel to the front end wall 46. An elongated pivot bar 116 is attached at one end to the arm 112 and extends radially from the arm 112. The other end of the pivot bar 116 is pivotally attached to a yoke 120 which is supported on frame member 74 by a bracket 121.

A horizontally disposed guide ledge 122 is provided for maintaining the story pole 100 at a constant height relative to the kiln 30. The ledge 122 extends outwardly from the kiln 30 at a level below the lowest layer of guideways 34 to define a guide surface upon which the wheel 114 rolls as the loading apparatus 28 rolls along the rails 82. The arm 112 and the adjustably mounted story pole 100 are biased upwardly by a spring 124 attached to the bracket 121. In this manner the story pole 100 is vertically adjustable relative to the frame 28, but remains in constant vertical relationship to the guideways 34 in the kiln 30 as the apparatus 28 rolls along the rails 82. Thus, regardless of vertical shifting of the rails 82 and main frame 70 relative to the guideways 34, the story pole 100 remains at a constant height relative to the kiln because the pole 100 is biased upwardly against the guide ledge 122, which is an integral portion of the kiln 30 and indexed to the position of the lowermost layer of guideways.

A plurality of vertical indexing plates 128 are mounted upon the central section 106 of the story pole 100. Each layer of guideways 34 has an individual plate 128 associated therewith. Each indexing plate 128 carries two stop lugs 130 and 131 which extend horizontally from the plates 128 a sufficient distance to engage a limit switch. Sensing means comprising four limit switches 132, 134, 136 and 138 are mounted upon a switch bracket 140, which is secured to the sub-frame 32 and extends between the vertical frame member 74 and the story pole 100 (FIGS. 7 and 8). The switches 132 and 134 are mounted on the bracket 140 in a position such that when one of them engages a stop lug 130 on an upward path it indicates that a guideway 34 has been reached. The switches 136 and 138 are mounted on the bracket 140 in a position as that when one of them engages a stop lug 131 on a downward path it indicates that a guideway 34 has been reached.

As noted above, each plate 128 carries two lugs 130 and 131. The uppermost plate, which is associated with the uppermost layer of guideways 34, carries a lug 130 positioned to engage the switch 132 and a lug 131 located to engage the switch 138. The lowermost plate 128, which is associated with the lowermost layer of guideways 34, also carries a lug 130 located to engage the switch 132 and a lug 131 located to engage the switch 138. The plates 128 between the uppermost plate and lowermost plate each carry a lug 130 located to engage the switch 134 and a lug 131 located to engage the switch 136.

When activated, the switch 138 indicates that the sub-frame 32 is positioned at the lowermost layer of guideways 34. When activated, the switch 132 indicates that the sub-frame 32 is positioned at the uppermost layer of guideways 34. When activated, the switches 134 and 136 signal that the sub-frame 32 is aligned with the related guideway 34. The switches 134 and 136 are oriented opposite to one another so that the switch 134 is activated by engagement with the cooperating lug 130 on the upward paths and the switch 136 is activated by engagement with the cooperating lugs 131 on the downward paths.

As shown in FIG. 4, at the top of the frame 70 means are provided for maintaining a predetermined spacing between the frame 70 and the kiln 30, despite any tilting of the apparatus 28 toward or away from the kiln 30, so that the vertically movable sub-frame 32 travels in a path which is parallel to the front end wall of the kiln 30. To this end, a rail 142 is rigidly mounted upon the top wall 40 of the kiln 30 adjacent to, and parallel to, the front end wall 46. A spacing bracket 144 secured to the top of the frame 70 extends horizontally from the frame 70 toward the kiln 30, extending over the rail 142. A pair of hydraulic cylinders 146, each having a selectively extendible piston rod 148, are mounted upon the bracket 144. The cylinders are mounted in a parallel manner on the side of the rail 142 which faces the frame 70. A pair of horizontally aligned bearing wheels 145 are also mounted upon the bracket 144, opposite from the extendible rods 148. Extension of the piston rods 148 causes the rail 142 to be engaged between the piston rods 148 and the wheels 145. The apparatus 28 is thus secured to the kiln 30 and neither wind nor the movement of equipment within the apparatus 28 can cause the apparatus 28 to sway. The distance between the kiln 30 and the frame 70 is thus fixed when the piston rods 148 are extended into engagement with the rail 142.

The discharge apparatus 36 is rigidly attached to the loading apparatus 28 by means of a truss 149 which extends over the top of the kiln 30. Thus, when the frame 70 is secured to the kiln 30, the unloading apparatus 36 is also held in a fixed position relative to the kiln 30.

FEED AND DISCHARGE CONVEYOR SYSTEM

In FIG. 1 there is illustrated a conveyor system for feeding and discharging the kiln 30. Infeed conveyor means 26 include a pair of endless chains 150 supported on pairs of sprockets 152 fixed on support shafts 154 journalled in frame members 156 in transverse relation thereto. The chains 150 are selectively movable through a suitable electric drive motor 157 which is connected in driving relation with one or more of the sprockets 152.

The infeed conveyor means 26 extends from the concrete blockmaking machine 20 to the front end wall 46 of the kiln 30 and extends along essentially the entire front wall 46 of the kiln 30, between the rails 82. The upper run of the chains 150 defines a horizontal plane at a level below the lowermost guideway layer.

The discharge conveyor means 38 include a pair of endless chains 158 similarly supported on pairs of sprockets 151 fixed on support shafts 153 journalled in frame members 155 in transverse relation thereto. The upper run of the chains 158 defines a horizontal plane at a level below the lowermost layer of guideways 34. The chains 158 are selectively movable through a suitable electric drive motor 159 which is connected in driving relation with the chain sprockets 151.

The discharge conveyor means 38 extends along the entire rear end wall 48 of the kiln and from the kiln 30 to a depalleter 160. From the depalleter 160, the emptied pallets 24 are carried by the conveyor means 38 back to the blockmaking machine 20.

ELEVATOR SYSTEM

In order to raise pallets 24 to the level of a selected guideway 34, an elevator 161 is included in the loading apparatus 28. The elevator 161 is supported on the main frame 70 and is adapted to lift pallets 24 vertically from the infeed conveyor 26. The elevator 161 includes an upper sprocket support shaft 162 and four lower sprocket support shafts 164. The shaft 162, which carries a pair of spaced-apart sprockets 166, is journalled in the main frame 70 adjacent to the top frame 76. The shaft 162 is oriented perpendicular to the plane of the front end wall 46 of the kiln 30. The shafts 164 are stub shafts, each carrying a single sprocket 168 and are journalled in brackets 170 attached to the bottom frame 78. The four shafts 164 are mounted in two colinear pairs at a level just above the upper run of the infeed conveyor chains 150. Each of a pair of endless chains 180 is engagingly mounted upon one of the sprockets 166 and a coplanar pair of the sprockets 164 for continuous travel therearound in an oval path (FIG. 2).

The chains 180 are parallel to one another and carry a plurality of pallet carriers 172. The carriers 172 are pivotally attached to the chains 180 by the pivotal brackets 174 so that as the shafts 162 and 164 and the sprockets 166 and 168 rotate, directing the elevator chains 180 over parallel oval paths, the carriers 172 successively follow a similar path, while maintaining a constant orientation. The chains 180 are selectively movable through a suitable electric drive motor (not shown) which is connected in driving relation with the shaft 162.

Each carrier 172 includes a pair of parallel, spaced-apart side walls 176 and 178 and an interconnecting crossbar 181, which maintains the side walls 176 and 178 in spaced-apart relation (FIG. 4). The crossbar 181 is positioned adjacent to the edge 183 to provide a substantially unobstructed path between the side walls 176 and 178. The side wall 176 of each carrier 172 carries four guide wheels 182 arranged in a rectangular pattern and the side wall 178 carries one wheel 184. The wheels 182 and 184 rollingly engage vertical stabilizing members 186 of the frame 70 to prevent rocking motion by the carrier 172, particularly when it carries a pallet 24. The facing surfaces 177 and 179 of the side walls 176 and 178, respectively, each carry two lugs 188. The lugs 188, which are rigidly fixed to the side walls 177 and 179, extending perpendicularly therefrom, are coplanar to carry a flat pallet 24 thereon. The side walls 177 and 179 are spaced apart by a distance slightly greater than the width of a pallet 24 to accept a pallet 24 carrying blocks 22 therebetween. The crossbar 181 is spaced above the lugs 188 by a sufficient distance to avoid striking the blocks 24 as the carrier 172 is carried into a lifting position by the chains 180. Each carrier 172 is carried by the chains 180 along a path in which the lugs 188 pass under a pallet 24 as the crossbar 181 passes over the blocks 22 carried on the pallet. The carrier then travels in an upwardly direction, and the lugs 188 engage the underside of a pallet 24 carried by the infeed conveyor chains 150 and lift the pallet 24 from the chains 150. After lifting a pallet 24, each carrier 172 is carried vertically upwardly toward the sprockets 166 by the chains 180. The wheels 182 and 184 maintain the pallet 24 in a horizontal position by riding along the vertical members 186. At the top of the elevator the carriers 172 are carried over the sprocket shaft 162, then descend toward the sprockets 164.

In order to ensure proper timing of the carriers 172 in relation to the location of pallets 24 carried by the infeed conveyor 26, a stop plate 190 is attached to the frame 70 immediately above the chains 150 (FIG. 4). The plate 190 is vertically oriented, perpendicular to the longitudinal axis of the conveyor 26. The plate 190 is located approximately midway between the axes of the coaxial pairs of shafts 164 and just above the upper run of the chains 150. A spring-biased shock absorbing plate 192 is pivotally secured to the stop plate 190 so that a pallet 24 traveling on the chains 150 strikes the plate 192 and overcomes the biasing action to bring the plate 192 into contact with the stop plate 190. A contact switch 194 is also mounted upon the plate 190. The switch 194 extends perpendicularly from the plate 190 parallel to, and midway between the chains 150, so that a pallet 24 carried by the chains 150 depresses and activates the switch 194 when it contacts the plate 190. When the switch 194 is activated, it indicates that a pallet 24 is in position for removal by an elevator carrier 172 and the chain drive for the elevator is activated.

PALLET INSERTION SYSTEM

Figure 9:
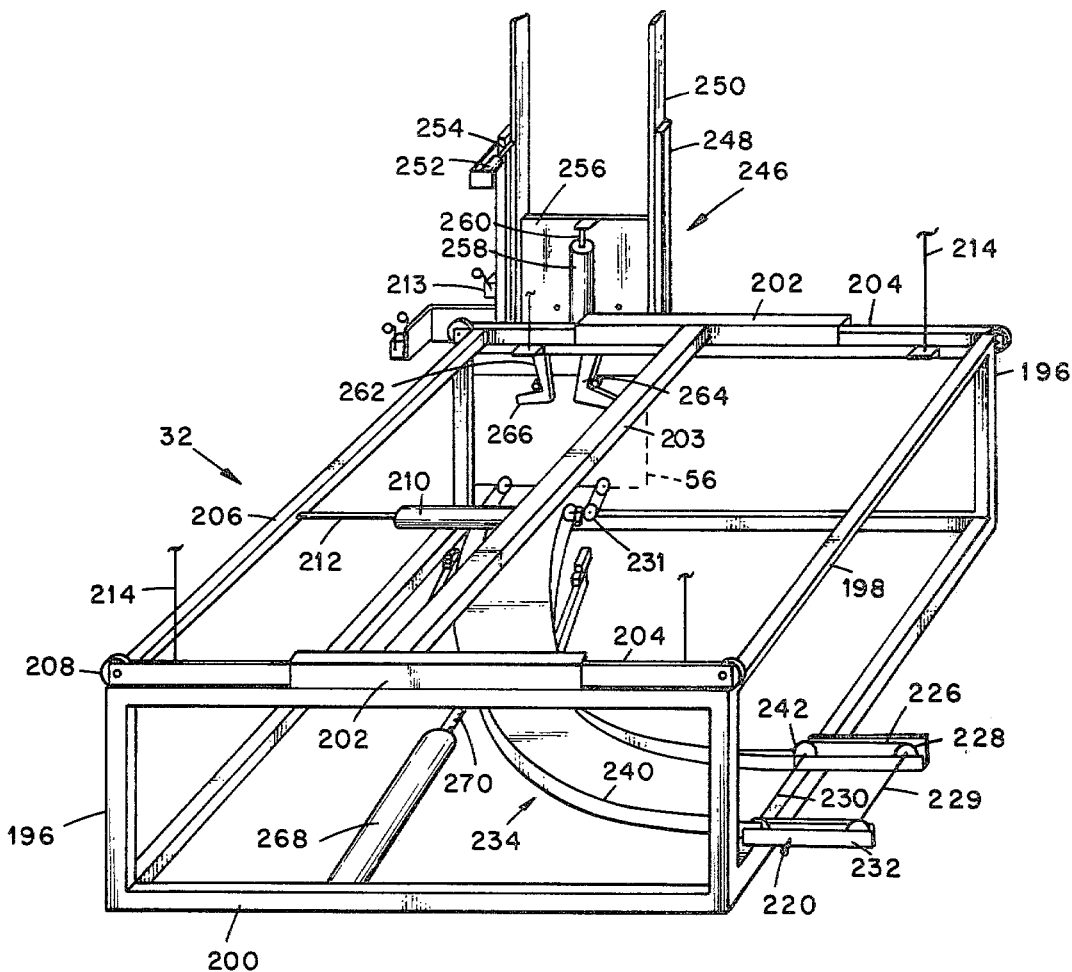
FIG. 9 is a perspective view of a loading subframe embodying various of the features of the present invention.
Figure 12:
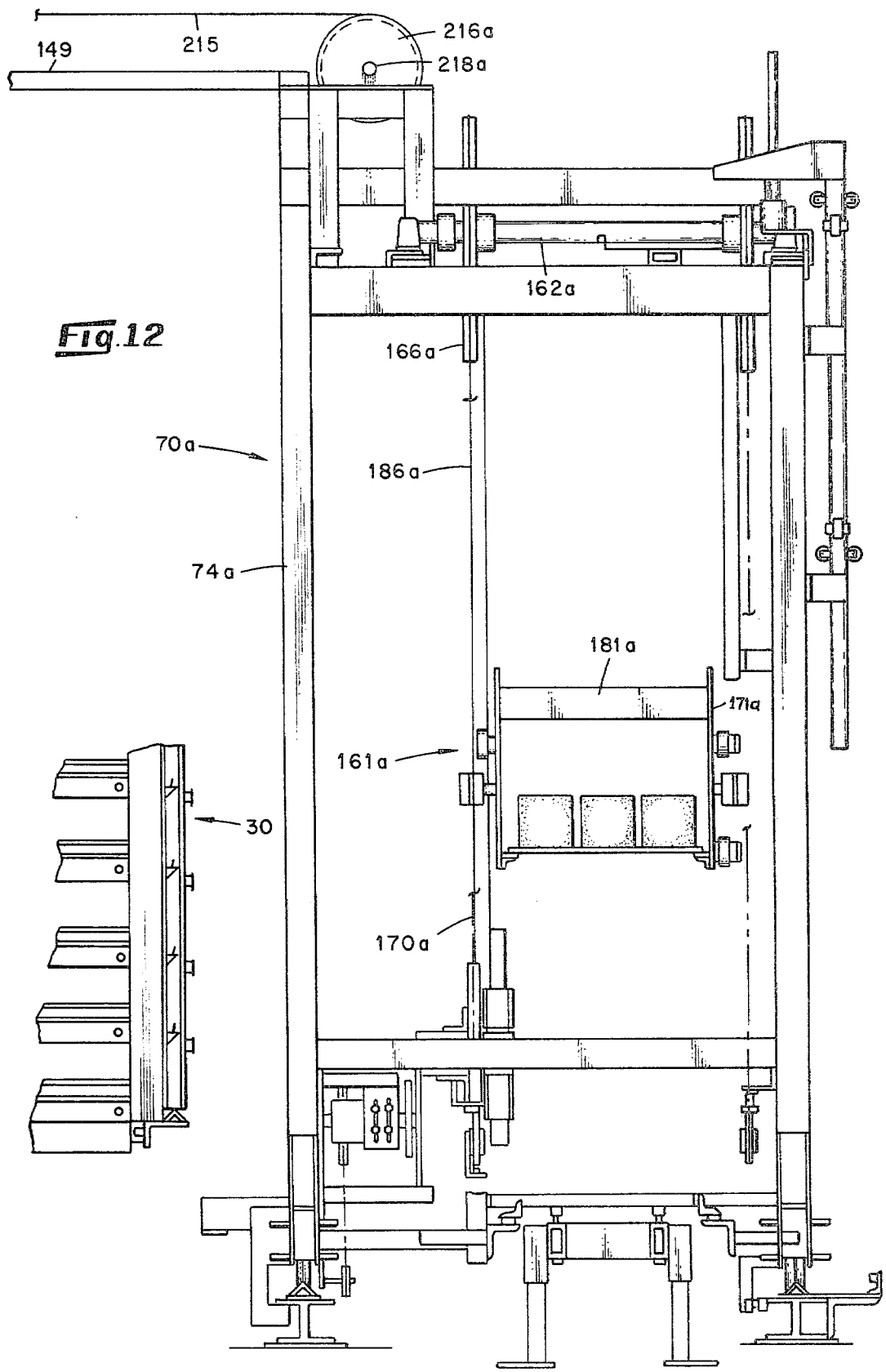
FIG. 12 is a side elevational view of an unloading apparatus embodying various of the features of the present invention.
Figure 13:
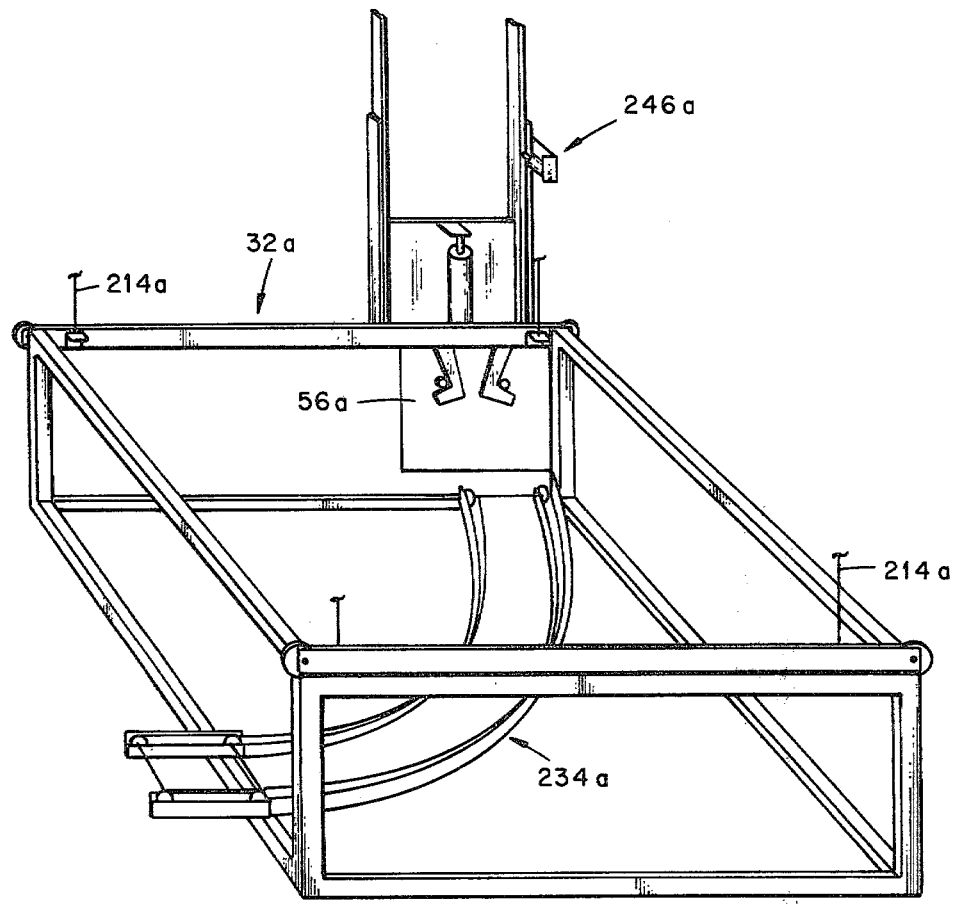
FIG. 13 is a perspective view of a discharge subframe embodying various of the features of the present invention.

In order to remove pallets 24 from the elevator and insert them into any guideway 34, an infeed subframe 32 is mounted within the main frame 70, adjacent to the elevator 161, for selective vertical movement between the lowermost layer of guideways 34 and the uppermost layer of guideways 34 of the kiln 30. As illustrated in FIG. 9, the sub-frame 32 includes four vertical members 196, a rectangular upper frame 198 interconnecting the vertical members 196 and a bottom frame 200 interconnecting the vertical members 196 to define a rectangular prismatic structure. A pair of horizontal sleeves 202 are attached to the top of the subframe top member 198 and interconnected by a sleeve crossbar 203. The sub-frame 32 is carried by a pair of core members 204 which are slidably received in the sleeve members 202. A core member crossbar 206, parallel to the crossbar 203, connects the core members 204 to each other. A guide roller 208 is rotatably mounted at each end of each core member 204 to permit the core members 204 to roll vertically between the main frame vertical members 72 and 74.

Means are provided for laterally aligning the sub-frame 32 with the desired guideway. This means includes a hydraulic cylinder 210, including an extendible piston rod 212, extends between the crossbar 203 and the crossbar 206. The cylinder 210 is attached to the crossbar 203 and the piston rod 212 is attached to the crossbar 206 such that extension and retraction of the rod 212 moves the sub-frame 32 laterally while the core member 204 remain stationary through engagement of the rollers 208 with the vertical members 72 and 74. Sensing means comprising a limit switch 213, operatively connected to the cylinder 210, is mounted upon the sub-frame 32 in a position adapted to engage lateral indexing means comprising the post 54 of each tier of guideways. This engagement indicates that the sub-frame 32 is exactly aligned laterally with a selected guideway.

The sub-frame 32 is suspended between the main frame members 72 and 74 by four cables 214, all of which are wound upon a drum 216 rotatably mounted at the top of the main frame 70 for selective winding and unwinding to raise and lower the sub-frame 32 within the frame 70. Each of the four cables 214 extends vertically downwardly from the drum 216 for attachment to the sub-frame 32. The drum 216 is mounted upon a shaft 218 selectively rotated by a reversible electric drive motor (not shown) which is connected in driving relationship with the shaft 218. All of the cables 214 are simultaneously wound and unwound to vertically raise and lower the sub-frame 32 while maintaining a horizontal orientation.

The sub-frame 32 carries means for opening the closure panel 56 of a selected guideway 34, means for carrying pallets 24 from the elevator carriers 172 to a location immediately adjacent to the selected guideway 34 and means for pushing a pallet 24 onto the selected guideway 34. A pickup conveyor 220 is provided for removing the pallets 24 from the elevator carriers 172 on their downward path. The conveyor 220 includes a pair of endless chains 226 supported on pairs of sprockets 228 fixed on support shafts 229 and 230 journalled in conveyor frame members 232 mounted upon the sub-frame 32. The conveyor frame members 232 extend laterally from the subframe 32, parallel to the infeed conveyor 26, between downward runs of the elevator chains 180 and between the plates 176 and 178 of each carrier 172. The members 232 extend outwardly from the sub-frame 32 by a distance which is less than the distance between the crossbar 181 and the edges 185 so that the crossbar 181 does not strike the members 232 as they pass between the side walls 176 and 178. Thus, as each pallet 24 is carried downwardly by a carrier 172, it is deposited upon the conveyor chains 226, which carry the pallet out of the path of succeeding carriers 172. The emptied carriers 172 then continue downwardly, under the sprocket shafts 164, to pick up another pallet 24 from the conveyor 26.

An arcuate conveyor 234 is provided for carrying the pallets 24 from the pickup conveyor 220 through a 90° turn to the front end wall 46 of the kiln 30. The conveyor 234, extends from the conveyor 220 to a location adjacent to the front end wall 46 of the kiln 30. The arcuate conveyor 234, which includes a pair of endless chains 240 supported on pairs of sprockets 242 fixed on support shafts 230 and 231 journalled in the frame 232 and sub-frame 32, respectively, carries pallets 24 from the pickup conveyor 220 to the front end wall 46 of the kiln 30 at a location adjacent to a selected guideway 34. The leading edge 244 of the pallet 24 is unchanged despite the 90° change of direction by the pallet 24 from the elevator carrier 172 to the wall 46 of the kiln 30. The blocks 22 continually travel in their stable, longitudinal direction from the machine 20 into curing position in the kiln 30.

Means are provided for opening the closure panels 56. As illustrated (FIG. 9) pneumatic lifting means 246 for opening the closure panels 56 of the kiln 30 are mounted upon the subframe 32. A pair of opener frame support members 248 extend vertically upwardly from the subframe 32, parallel to the wall 46 of the kiln 30 and spaced apart from one another. A planar opener frame 250 is pivotally mounted between the frame members 248 for pivotal motion about a horizontal axis parallel to the wall 46 of the kiln 30. A hydraulic cylinder 252 including a selectively extendible piston rod 254 interconnects the frame 250 to one of the members 248 such that extension and retraction of the piston rod 254 causes the frame 250 to pivot relative to the horizontal axis parallel to the wall 46 of the kiln 30. A planar opener subframe 256 is slidably mounted upon the opener support frame 250 for sliding motion within the plane defined by the opener support frame 250. A hydraulic cylinder 258, including a selectively extendible piston rod 260 is secured to the opener support frame 250 in a generally vertical position. The cylinder 258 is secured to the frame 250 and the rod 260 is secured to the subframe 256 such that extension and retraction of the piston rod 260 causes the subframe 256 to be raised and lowered, respectively, relative to the frame 250.

In order to lift the closure panels 56, a pair of opening arms 262 are pivotally mounted upon the subframe 256, extending downwardly from the subframe 256 within the plane defined by the subframe 256. Each of the arms 262 is generally L-shaped, including an elongated first section 264 and a second section 266 extending perpendicularly from the first section 264. The first section 264 of each arm 262 is pivotally mounted upon the subframe 265 in a coplanar relation. The second sections 266 of the arms 262 extend away from one another The arms 262 are thus pivotable into and from a position of engagement with the knobs 68 on a closure panel 56 by suitable hydraulic cylinder means (not shown).

Pusher means are also mounted upon the subframe 32 for pushing pallets 24 from the arcuate conveyor 234 onto an adjacent selected guideway 34. As illustrated in FIG. 11, the pusher means includes a hydraulic cylinder 268 having a selectively extendible piston rod 270. The cylinder 268 is attached to the subframe 32 in a horizontal position, perpendicular to the wall 46 of the kiln 30 at a level below the plane defined by the upper run of the chains 240 of the arcuate conveyor 234. A yoke member 272 is attached to the piston rod 270 and slidably mounted upon the subframe 32 at a level below the plane defined by the upper run of the chains 240. Extension and retraction of the piston rod 270 causes the yoke 272 to slide towards and away from the end wall 46, respectively. A pair of elongated push members 274, each having an attached end 276 and an unattached end 278, are pivotally attached to the yoke 272 at the ends 276. Each push member 274 is oriented to extend the unattached end 278 toward the wall 46 of the kiln 30. The unattached end 278 is biased upwardly such that the unattached end 278 extends just above the plane defined by the upper run of the chains 240. The biasing action upon the push members 274 is not of sufficient strength to lift a pallet carrying concrete blocks. Thus, when the piston rod 270 is retracted and a pallet is placed between the push members 278 and a selected guideway 34 by the conveyor 234, extension of the piston rod 270 moves the push members 274, which are biased upwardly, into engagement with the following edge 280 of the pallet 24. Further extension of the piston rod 270 pushes the pallet 24 onto the selected guideway 34. Thereafter, when the rod 270 is retracted, the members 274 are pulled back away from the wall 46, striking the leading edge 244 of the succeeding pallet 24. However, because the upward biasing action upon the members 274 is insufficient to lift the succeeding pallet 24, the push members 274 are drawn under the succeeding pallet 24. In this manner the conveyor 234 simultaneously carries a succeeding pallet 24 to a location immediately adjacent to a selected guideway while the push members 274 are retracted.

UNLOADING APPARATUS

The unloading apparatus 36 accepts pallets 24 carrying cured blocks 22 from the guideways 34 and transports them to a discharge conveyor 38. The apparatus 36 is essentially identical to the loading apparatus 28 in many respects and operates in essentially a reverse manner. Parts of the unloading apparatus 36 which are common to the loading apparatus 28 are designated in the drawings with the same number as the corresponding portion of the loading apparatus, followed by the letter "a."

The unloading apparatus 36 includes a main frame 70a which carries a vertically movable subframe 32a and an elevator 161a. The subframe 32a carries closure panel lifting means 246a and conveyor means, comprising an arcuate receiving conveyor 234a for carrying pallets 24 discharged from the kiln 30 to the elevator 161a. The unloading apparatus 36 does not include means corresponding to the hydraulic pusher means of the loading apparatus 28 because pallets 24 are pushed from the guideways 34 by the loading apparatus 28. That is, pallets are merely pushed out of the guideway by the pusher members 274 of the loading apparatus 28 and deposited upon the discharge conveyor 234a.

The discharge subframe 32a is also suspended from vertically adjustable cables 214a. The precise lateral adjustment means provided for the subframe 32, including the sliding core members 204, the cylinder 210 and the switch 213 are also omitted in the subframe 32a. The exact orientation of the unloading apparatus 36 is not quite as important as the orientation of the loading apparatus 28 because the pallets 24 are moving onto a conveyor 234a rather than into the U-shaped rails 50 of a guideway 34. Nevertheless, it remains undesirable for the pallets 24 to drop onto the unloading apparatus conveyor 234a. The drum 216a is tied to the drum 216 by a cable 215 which is trained around each of the drums 216 and 216a. The cable extends over the top of the kiln 30, so that as the drum 216 is rotated to raise or lower the subframe 32, the drum 216a is simultaneously rotated to raise or lower, respectively, the subframe 32a. The truss 149 prevents the tension of the cable 215 from drawing the frames 70 and 70a toward one another.

The unloading apparatus does not require limit switches corresponding to the switches 90, 92 and 94 on the loading apparatus 28. Nor are there indexing plates corresponding to the indexing plates 84 adjacent to the rails 82a supporting the unloading apparatus 36. Instead, the unloading apparatus 36 is moved along the rails 82a simultaneously with the loading apparatus 28 by means of a continuous cable 282 which extends around the kiln 30 in a generally C-shaped pattern. The cable 282 is carried by four pulleys 283, each of which is located at one of the corners of the kiln 30 and mounted on the foundation with a vertical axis of rotation. The C-shaped pattern provides two runs of the cable 282 on both the front end wall 46 and the rear end wall 48, with one run travelling in each direction. The loading apparatus 28 and unloading apparatus 36 are each attached to the appropriate run of the cable 282 so that they move in a co-directional manner as the loading apparatus 28 is pulled back and forth along the face of the kiln 30 by means of a conventional motordriven chain (not shown).

OPERATION

In operation, the loading apparatus 28 and the unloading apparatus 36 are simultaneously moved rapidly along the rails 82 and 82a by the cable 282 until the deceleration switch 98 engages the deceleration lug 96 of the first indexing plate 84, indicating that the first tier of guideways is being approached. The loading apparatus 28 and unloading apparatus 36 are then slowed until the switch 90 engages the lug 86, indicating that the first tier has been reached and the apparatus 28 and 36 are stopped simultaneously. At the same time, the switch 92 engages the lug 88, conditioning the subframes 32 and 32a to travel upwardly along the tier.

The loading apparatus 28 is then secured to the kiln 30 to prevent swaying of the apparatus 28. The two hydraulic cylinder pistons 146 are simultaneously extended to engage the rail 142 between the pistons 146 and the wheels 145. Thus, the apparatus 28 is locked in position in general alignment with the first tier of guideways 34 and parallel to the front end wall 46. The unloading apparatus 36 is simultaneously fixed relative to the kiln 30 because the truss 149 ties together the frames 70 and 70a.

In order to align the conveyor 234 with the lowermost guideway of the first tier, the subframe 32 is raised by rotating the drum 216 to wind the cables 214. The subframe 32 is raised until the switch 132 engages the stop lug 130 on the first indexing plate 128 on the story pole 100. Simultaneously, the conveyor 234a is vertically aligned with the lowermost guideway of the first tier by rotating the drum 216a, through the cable 215, to wind the cables 214a. The subframes 32 and 32a are thus stopped at precisely the height of the lowermost guideway 34.

In order to precisely align the subframe 32 with the rails 50 of the lowermost guideway 34, when the switch 132 engages the lug 130, the hydraulic cylinder 210 is activated to retract the piston 212. As the piston is retracted, the subframe sleeves 202 slide along the core members 204. When the switch 213 engages the guidepost 52 adjacent to the lowermost guideway 34 of the first tier, the conveyor 234 of the subframe 32 is exactly aligned with the rails 50 of the lowermost guideway 34 of the first tier.

When the switch 213 is activated to indicate alignment, the planar opener frame 250 is pivoted by the hydraulic cylinder 252 to locate the second sections 266 of the opening arms 262 just below the pair of knobs 68 on the front end closure panel 56 of the lowermost guideway 34. The hydraulic cylinder 258 is then activated to lift the opener subframe 250, causing the second sections 266 of the arms 262 to engage the knobs 68 and lift the closure panel 56 for the lowermost guideway 34. Similarly, the rear end closure panel 56a of the lowermost guideway of the first tier is opened by the lifting means 246a.

"Green" or uncured cement blocks 22 formed by the blockmaking machine 20 are placed upon pallets 24 which are deposited upon the conveyor chains 150. The pallets 24 are carried by the chains 150 along the wall 46 of the kiln 30 until the pallet 24 engages the switch 194 of the loading apparatus 28. At this time, the elevator 161 is activated to cause a carrier 172 to engage the stopped pallet 24 from below, lifting the pallet 24 from the chains 150. The carrier 172 carries the pallet 24 upwardly, over the sprocket axle 162 and downwardly toward the subframe 32. The conveyors 220 and 234 of the subframe 32 are activated so that as the carrier 172 passes downwardly past the conveyor 220, the pallet 24 is deposited upon the chains 226, which then carry the pallet 24 to the arcuate conveyor 234. The pallet 24 is transferred to the arcuate conveyor 234 which carries the pallet 24 to a location immediately adjacent to the lowermost guideway 34. Thereafter, the hydraulic cylinder 268 is activated to extend the push members 274 into engagement with the following edge 280 of the pallet. The push members are extended to the wall 46 of the kiln 30, thus pushing the pallet 24 into the guideway 34. The piston 270 of the cylinder 268 is then withdrawn, drawing the push members 278 back to their initial positions as a succeeding pallet is carried by the arcuate conveyor 234, over the withdrawing push members 278, into position adjacent to the front end wall 46 of the kiln 30.

A plurality of pallets carrying blocks 22 are sequentially deposited upon the conveyor 26 by the blockmaking machine 20 in spaced apart intervals. The deposited pallets 24 are carried to the elevator 161 where they are picked up by successive carriers 172. The pallets 24 are deposited upon the conveyor 234 in spaced apart intervals. The spacing between successive pallets 24 is preferably determined to allow a succeeding pallet 24 to be moved into a loading position by the arcuate conveyor 234 during the same period that the push members 278 are withdrawn. As noted above, the push members 278 are biased upwardly for engagement with the following edges 280 of pallets 24. However, the strength of the biasing action is insufficient to overcome the weight of a pallet loaded with blocks 22. Therefore, as the push members 278 are withdrawn, they are depressed and pass under the succeeding pallet 24 which is being carried by the conveyor 234 into a position adjacent to the guideway 34. The cylinder piston 270 is then extended again to push the succeeding pallet 24 into the guideway 34.

As each pallet 24 carrying "green" blocks 22 is pushed into the guideway 34 at the front end wall 46, a pallet 24 carrying cured blocks is simultaneously discharged from the same guideway 34 at the rear end wall 48. The pallet 24 is discharged onto the arcuate conveyor 234a, which carries the pallet to the elevator 161a. An elevator carrier 172a sequentially lifts each pallet 24 from the conveyor 234a and carries it upwardly over the axle 162a and then downwardly toward the discharge conveyor 38. The pallet 24 is deposited on the conveyor 38 as the carrier walls 176a and 178a pass on either side of the conveyor 38. The pallets 24 carrying cured blocks are then carried to a depalleter 160 where the blocks are removed and stacked for storage and shipping.

The sequential loading and unloading of pallets 24 into and from the guideway 34 is repeated until the first guideway is refilled with "green" blocks. Operation of the conveyors 26, 38, 234 and 234a and the elevators 161 and 161a are stopped, then the lifting means 246 and 246a lower the respective closure panels 56, sealing the kiln 30. The opener frames 250 and 250a are pivoted away from the wall 46 so that when the subframes 32 and 32a are raised to the next level, the arm second sections 266 and 266a do not engage the knobs 68 of the first closure panel. The cylinder piston 212 is then extended to push the subframe 32 out of lateral alignment with the guidepost 50 so that it is prepared for realignment with the next guideway of the tier. Then the subframe 32 and 32a are raised until the switch 134 engages the lug 130 on the second indexing plate 128. The sequence is then repeated for laterally aligning the subframe 32 with the second layer guideway 34 of the first tier. The closure panels 56 are opened at each end of the guideway and the second layer guideway 34 is then filled as the first layer guideway was filled. In the same manner, the subframes 32 and 32a are successively moved upwardly and each of the layers of the first tier of guideways is emptied of cured blocks and filled with pallets 24 and uncured blocks 22. When the uppermost guideway 34 of the tier is refilled, the closure panels 56 and 56a are lowered, the subframe 32 is laterally adjusted away from the post 50 and the pistons 148 are released from the rail 142. The apparatus 28 and 36 are then moved rapidly along the rails 82, tied together by the cable 282, until the switch 98 engages the deceleration lug 96 and then switch 90 engages the lug 86 and the switch 94 engages the lug 88 on the second indexing plate 84. The subframes 32 and 32a are now conditioned for downward travel along the second tier of guideways 34. The pistons 148 are again extended to engage the rail 142. Thereafter the second tier is reloaded in a manner exactly like the first tier, with the exception that the subframes 32 and 32a are sequentially lowered rather than raised between successive guideways. The reloading process is repeated for each tier of guideways and each layer of each tier until the kiln 30 is entirely refilled with pallets carrying uncured blocks 22. The kiln remains closed until the blocks first pushed into the lowermost guideway 34 of the first tier have been cured under suitable temperature and humidity conditions. Then the entire reloading process is repeated, starting again at the lowermost guideway 34 of the first tier.

Suitable conventional signalling means are provided at each station in the apparatus to indicate whether the station is prepared to receive a succeeding pallet and whether a succeeding pallet is in position or being acted upon. The loading and unloading apparatus may be operated on a manual basis. Alternatively, suitable automatic controlling means may be provided with operative connections to each of the switches, cylinders and motors of the system.

Loading and unloading apparatus constructed in accordance with the present invention provide exact orientation with guideways of a kiln. Regardless of shifting of the foundation for the apparatus, the pallets are properly aligned for insertion into close-fitting channels. There is no opportunity for the pallets to jam by striking the face of the kiln. As a result, the speed of loading and unloading is increased because there is no misalignment to require shutdowns. Also, successive pallets do not have to wait for the pushing means to be removed from the path to the kiln, thus further increasing the speed of loading and unloading. The entire loading process for each guideway permits the green blocks to move in a continuous flow from the blockmaking machine to the kiln. The only reciprocating motion is in the pushing means which does not interfere with the progress of the pallets. Moreover, the "green" blocks can handle the increased speed of travel because they travel only in the direction of their strong dimension.

As each pallet leaves the blockmaking machine, it carries one or more "green" blocks oriented in the strong direction. The pallet travels over the infeed conveyor, the elevator, the arcuate conveyor and into the selected guideway with a constant leading edge. As discussed hereinabove, the "green" blocks can handle increased speeds because of the constant flow and the orientation in the strong direction, i.e., the longitudinal direction. In addition, the rate at which blocks can be treated is increased by maintaining a constant leading edge. That is, the width of the pallets can be increased, to carry more blocks, yet there is no need to increase the spacing between successive pallets. Thus, the rate of handling blocks can be increased because the rate of handling pallets remains constant regardless of the width of the pallets.

While a preferred embodiment has been shown and described herein, it will be understood that there is no intention to limit the invention by the disclosure, but rather, it is intended to cover all modifications and alternate constructions falling within the spirit and scope of the invention as defined in the appended claims.

I claim:

1. In a system for curing concrete blocks carried on pallets comprising a kiln including a front end wall and a rear end wall, a plurality of guideways in said kiln, each of said guideways having an infeed end at said front end wall and a discharge end at said rear end wall, each of said guideways being proportioned to receive a plurality of said pallets, and said guideways being arranged in a grid wherein said guideways are disposed in horizontally aligned layers and vertically aligned tiers, means for inserting said pallets into a selected guideway of a selected tier and a selected layer, comprising a laterally movable main frame having an upper end and a lower end, a vertically movable subframe supported on said main frame, means for delivering pallets to said subframe, a conveyor mounted on said subframe for receiving said pallets and for inserting said pallets into the infeed ends of said guideways, and means for aligning said conveyor with said selected guideway including vertical indexing means corresponding to the height of each layer in said tier, means on said subframe for sensing a predetermined one of said vertical indexing means to position said subframe in vertical alignment with a selected guideway regardless of variations in the vertical position of said selected guideway relative to said main frame, lateral indexing means for each guideway, sensing means connected to said conveyor for engaging said lateral indexing means and means for laterally moving said conveyor relative to said main frame to engage said sensing means with said lateral indexing means to laterally align said conveyor with the inlet end of a selected guideway.

2. A system as defined in claim 1 wherein said means for aligning said conveyor with said selected guideway further includes a plurality of stationary horizontal indexing plates, each of said horizontal indexing plates being associated with one of said tiers and switch means mounted upon said main frame and adapted for successive engagement with said indexing plates to indicate alignment with the associated tier of guideways.

3. A system as defined in claim 1 and further comprising means for pushing pallets from said conveyor into said selected guideway comprising a cylinder and a selectively extendible and retractable pusher rod, said cylinder being secured to said subframe below said conveyor and generally perpendicular to said front end wall of said kiln, said pusher rod being secured to a pivotal pusher member biased upwardly above said conveyor whereby extension of said pusher rod causes said pusher member to push a pallet into said kiln and retraction of said pusher rod causes said pusher member to pass under a succeeding pallet.

4. In a system for curing concrete blocks carried on pallets comprising a kiln including a front end wall and a rear end wall, a plurality of guideways in said kiln, each of said guideways having an infeed end at said front end wall and a discharge end at said rear end wall, each of said guideways being proportioned to receive a plurality of said pallets, and said guideways being arranged in a grid wherein said guideways are disposed in horizontally aligned layers and vertically aligned tiers, means for inserting said pallets into a selected guideway of a selected tier and a selected layers, comprising a laterally movable main frame, a vertically movable subframe supported on said main frame, and means for delivering pallets to said subframe for insertion into the infeed end of said guideways, means for aligning said subframe with said selected guideway including a vertically extending member having a plurality of vertical indexing means which are spaced apart to correspond to the spacing of the layers of said guideways, said member being mounted upon said main frame for vertical movement relative thereto and means for maintaining a fixed point on said member in a position corresponding in height to one of the guideways in the tier containing the selected guideway, and means on said subframe for sensing a predetermined one of said vertical indexing means to position said subframe in vertical alignment with a selected guideway regardless of variations in the vertical position of said selected guideway relative to said main frame.

5. A system as defined in claim 4 wherein means connected to said vertically extending member is biased against a member mounted on said kiln which corresponds to the height of one of said layers across the front end wall of said kiln adjacent said main frame whereby said vertically extending member is maintained in a constant position relative to the layers of said guideways as said main frame is laterally moved.

6. In a system for curing concrete blocks carried on pallets comprising a kiln including a front end wall and a rear end wall, a plurality of guideways in said kiln, each of said guideways having an infeed end at said front end wall and a discharge end at said rear end wall, each of said guideways being proportioned to receive a plurality of said pallets, and said guideways being arranged in a grid wherein said guideways are disposed in horizontally aligned layers and vertically aligned tiers, means for inserting said pallets into a selected guideway of a selected tier and a selected layer, comprising a main frame having an upper end and lower end, a vertically movable subframe supported on said main frame, and means for delivering pallets to said subframe for insertion into the infeed end of said guideways, means for supporting the lower end of said main frame for movement along the front end wall of said kiln a predetermined distance therefrom, an elongated member extending across the front end of said kiln adjacent its upper end and parallel thereto, means on the upper end of said main frame for engaging said elongated member across said front end of said kiln at a distance such that the path of the vertically movable subframe is parallel to the front end wall of said kiln, said engaging means on said main frame including a member carrying clamping means for selective connection to said elongated member.

7. A system in accordance with claim 6 wherein said clamping means comprises an opposed pair of cylinder and pistons each engaging on opposite sides of said elongated member.

8. In a system for curing concrete blocks carried on pallets comprising a kiln including a front end wall and a rear end wall, a plurality of guideways in said kiln, each of said guideways having an infeed end at said front end wall and a discharge end at said rear end wall, each of said guideways being proportioned to receive a plurality of said pallets, and said guideways being arranged in a grid wherein said guideways are disposed in horizontally aligned layers and vertically aligned tiers, means for inserting said pallets into a selected guideway of a selected tier and a selected layer, comprising a laterally movable main frame, a vertically movable subframe supported on said main frame, and means for delivering pallets to said subframe, a conveyor for receiving said pallets and for inserting said pallets into the infeed end of said guideways, lateral indexing means for each guideway, sensing means connected to said conveyor for engaging said lateral indexing means, and means for laterally moving said conveyor relative to said main frame to engage said sensing means with said indexing means to laterally align said conveyor with the inlet end of a selected guideway.

9. In a system for curing concrete blocks carried on pallets comprising a kiln including a front end wall and a rear end wall, a plurality of guideways in said kiln, each of said guideways having an infeed end at said front end wall and a discharge end at said rear end wall, each of said guideways being proportioned to receive a plurality of said pallets, and said guideways being arranged in a grid wherein said guideways are disposed in horizontally aligned layers and vertically aligned tiers, means for inserting said pallets into a selected guideway of a selected tier and a selected layer, comprising an infeed conveyor disposed in a position parallel to the front end wall of said kiln, a laterally movable first main frame disposed for movement along said infeed conveyor, a vertically movable subframe supported on said first main frame, an elevator on said first main frame for lifting pallets from said infeed conveyor and depositing said pallets on said subframe, an arcuate conveyor on said subframe for carrying said pallets from said elevator to the inlet end of a selected guideway, and pusher means for pushing pallets from said arcuate conveyor into said selected guideway, a discharge conveyor disposed in a position parallel to the rear end wall of said kiln, a second laterally movable main frame disposed for movement along said discharge conveyor, a vertically movable subframe supported on said second main frame, an elevator on said second main frame for depositing pallets from said subframe on said discharge conveyor, an arcuate conveyor on said subframe for receiving pallets from said selected guideway and conveying said pallets to said elevator on said second main frame whereby a single edge of each pallet is at all times the leading edge as the pallet is moved from the infeed conveyor, the arcuate conveyor associated with the first main frame, the selected guideway, the arcuate conveyor associated with the second main frame, and said discharge conveyor.

* * * * *